United States Patent
Lingg et al.

(10) Patent No.: US 10,620,637 B2
(45) Date of Patent: Apr. 14, 2020

(54) SYSTEMS AND METHODS FOR DETECTION, CLASSIFICATION, AND GEOLOCATION OF TRAFFIC OBJECTS

(71) Applicant: GM GLOBAL TECHNOLOGY OPERATIONS LLC, Detroit, MI (US)

(72) Inventors: Andrew J. Lingg, Rochester Hills, MI (US); Orhan Bulan, Troy, MI (US); David H. Clifford, Royal Oak, MI (US); Daniel Taylor, Belleville, MI (US); Benjamin J. Cool, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 23 days.

(21) Appl. No.: 15/826,294

(22) Filed: Nov. 29, 2017

(65) Prior Publication Data
US 2019/0163193 A1 May 30, 2019

(51) Int. Cl.
| | |
|---|---|
| *G01C 21/28* | (2006.01) |
| *G01C 21/32* | (2006.01) |
| *G01C 21/36* | (2006.01) |
| *G01S 17/86* | (2020.01) |
| *G01S 17/89* | (2020.01) |
| *G01S 17/93* | (2020.01) |
| *G01S 17/931* | (2020.01) |
| *G05D 1/02* | (2020.01) |
| *G06K 9/00* | (2006.01) |
| *G06K 9/46* | (2006.01) |

(Continued)

(52) U.S. Cl.
CPC ........... *G05D 1/0221* (2013.01); *G01C 21/28* (2013.01); *G01C 21/3602* (2013.01); *G01S 17/86* (2020.01); *G01S 17/89* (2013.01); *G01S 17/93* (2013.01); *G01S 17/931* (2020.01); *G05D 1/0246* (2013.01); *G06K 9/6267* (2013.01); *G06K 9/66* (2013.01); *G06T 5/20* (2013.01); *G06T 7/90* (2017.01)

(58) Field of Classification Search
None
See application file for complete search history.

(56) References Cited

U.S. PATENT DOCUMENTS 10,108,867 B1 * 10/2018 Vallespi-Gonzalez ...................... G06K 9/00369
10,255,525 B1 * 4/2019 Totolos, Jr. ............... G06T 7/70

(Continued)

OTHER PUBLICATIONS

Bag, S., "Deep Learning Localization for Self-driving Cars" (2017). Thesis. Rochester Institute of Technology (Year: 2017).*

(Continued)

*Primary Examiner* — Soo Shin
(74) *Attorney, Agent, or Firm* — Lorenz & Kopf, LLP

(57) ABSTRACT

Systems and methods of mapping traffic related objects. In one embodiment, a method includes: receiving image sensor data relating to an environment associated with a vehicle; receiving lidar sensor data relating to the environment associated with the vehicle; selecting, by a processor, at least one image region including a traffic related object from the image sensor data; selectively filtering, by a processor, the at least one image region based on the lidar sensor data; and generating, by a processor, a composite map including a representation of the traffic related object superimposed upon a defined map of the environment based on the selectively filtering.

16 Claims, 5 Drawing Sheets

(51) Int. Cl.
  *G06K 9/62*    (2006.01)
  *G06K 9/66*    (2006.01)
  *G06T 5/20*    (2006.01)
  *G06T 7/90*    (2017.01)

(56) References Cited

U.S. PATENT DOCUMENTS

2018/0348346 A1* 12/2018 Vallespi-Gonzalez ..................... G01S 7/4861
2018/0349746 A1* 12/2018 Vallespi-Gonzalez ..................... G06K 9/6277
2018/0364717 A1* 12/2018 Douillard ............... G05D 1/024
2019/0095721 A1*  3/2019 Ion ..................... G06K 9/00805

OTHER PUBLICATIONS

Chen, L., et al., "Turn Signal Detection During Nighttime by CNN Detector and Perceptual Hashing Tracking" IEEE Transactions on Intelligent Transportation Systems, vol. 18, No. 12, Dec. 2017, pp. 3303-3314, Date of Publication: Apr. 4, 2017 (Year: 2017).*
Pendleton, S.D., et al., "Perception, Planning, Control, and Coordination for Autonomous Vehicles" Machines. 2017; 5(1):6 (Year: 2017).*
Wolcott, R.W., "Robust Localization in 3D Prior Maps for Autonomous Driving" (2016) Dissertation. University of Michigan (Year: 2016).*

* cited by examiner

SYSTEMS AND METHODS FOR DETECTION, CLASSIFICATION, AND GEOLOCATION OF TRAFFIC OBJECTS

TECHNICAL FIELD

The present disclosure generally relates to autonomous vehicles, and more particularly relates to systems and methods for detecting and mapping traffic related objects in an autonomous vehicle.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in navigation systems, such systems might still be improved in a number of respects. For example, autonomous vehicles often encounter traffic related objects along a route to a planned destination. It would be advantageous to detect and map the presence of traffic related objects to assist in, among other things, path planning and future destination planning.

Accordingly, it is desirable to provide systems and methods for detecting, classifying, and mapping traffic related objects in autonomous vehicles. Furthermore, other desirable features and characteristics of the present invention will become apparent from the subsequent detailed description and the appended claims, taken in conjunction with the accompanying drawings and the foregoing technical field and background.

SUMMARY

Systems and methods of mapping traffic related objects. In one embodiment, a method includes: receiving image sensor data relating to an environment associated with a vehicle; receiving lidar sensor data relating to the environment associated with the vehicle; selecting, by a processor, at least one image region including a traffic related object from the image sensor data; selectively filtering, by a processor, the at least one image region based on the lidar sensor data; and generating, by a processor, a composite map including a representation of the traffic related object superimposed upon a defined map of the environment based on the selectively filtering.

In one embodiment a system for controlling a vehicle is provided. In one embodiment, the system includes: an image sensor that generates image data relating to an environment associated with a vehicle; a lidar sensor data that generates lidar data relating to the environment associated with the vehicle; and a control module having a processor configured to select at least one image region including a traffic related object from the image sensor data, selectively filter the at least one image region based on the lidar sensor data; generate a composite map including a representation of the traffic related object superimposed upon a defined map of the environment based on the selectively filtering, and control the vehicle based on the composite map.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
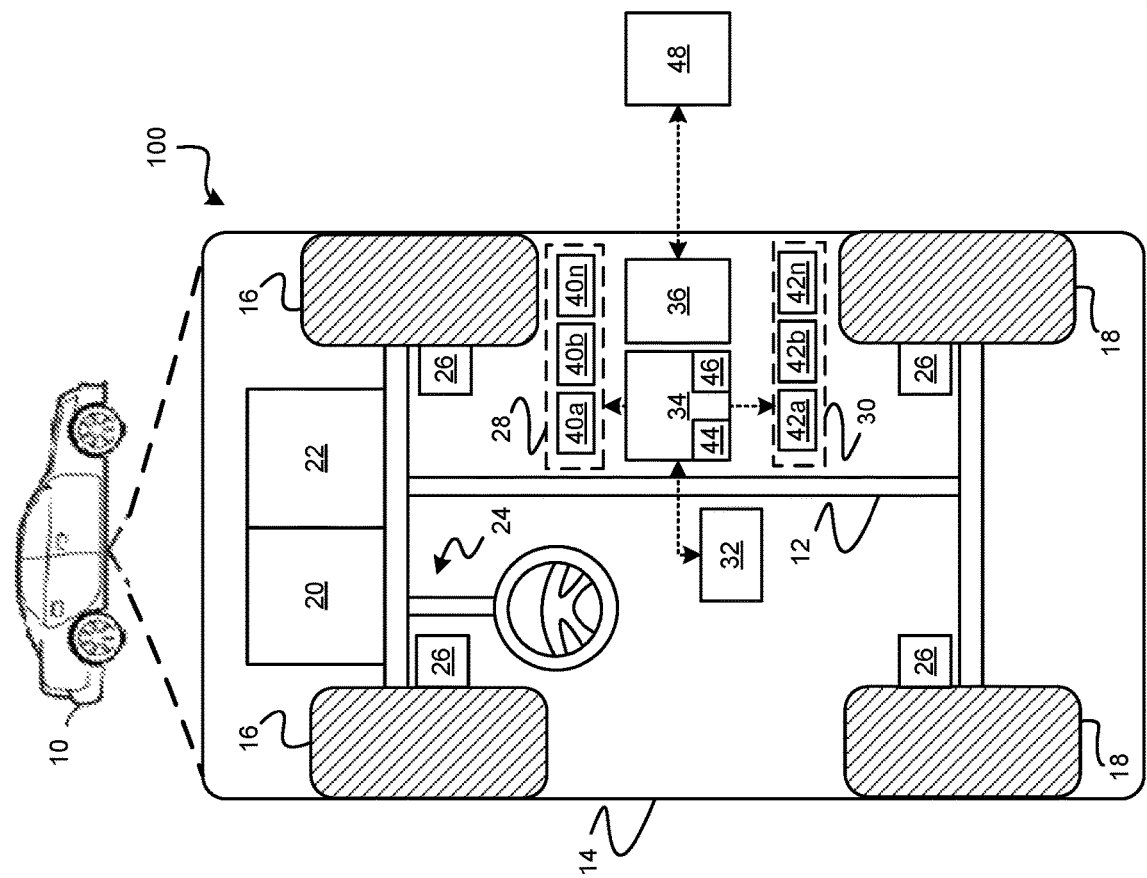
FIG. 1 is a functional block diagram illustrating an autonomous vehicle including a traffic object management system, in accordance with various embodiments.

With reference to FIG. 1, a traffic object management system shown generally as 100 is associated with a vehicle 10 in accordance with various embodiments. In general, the traffic object management system (or simply "system") 100 allows for detecting, classifying, and mapping the presence of traffic related objects in the vicinity of a vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the traffic object management system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10 (such as the state of one or more occupants). Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement the traffic object management system 100 as discussed in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
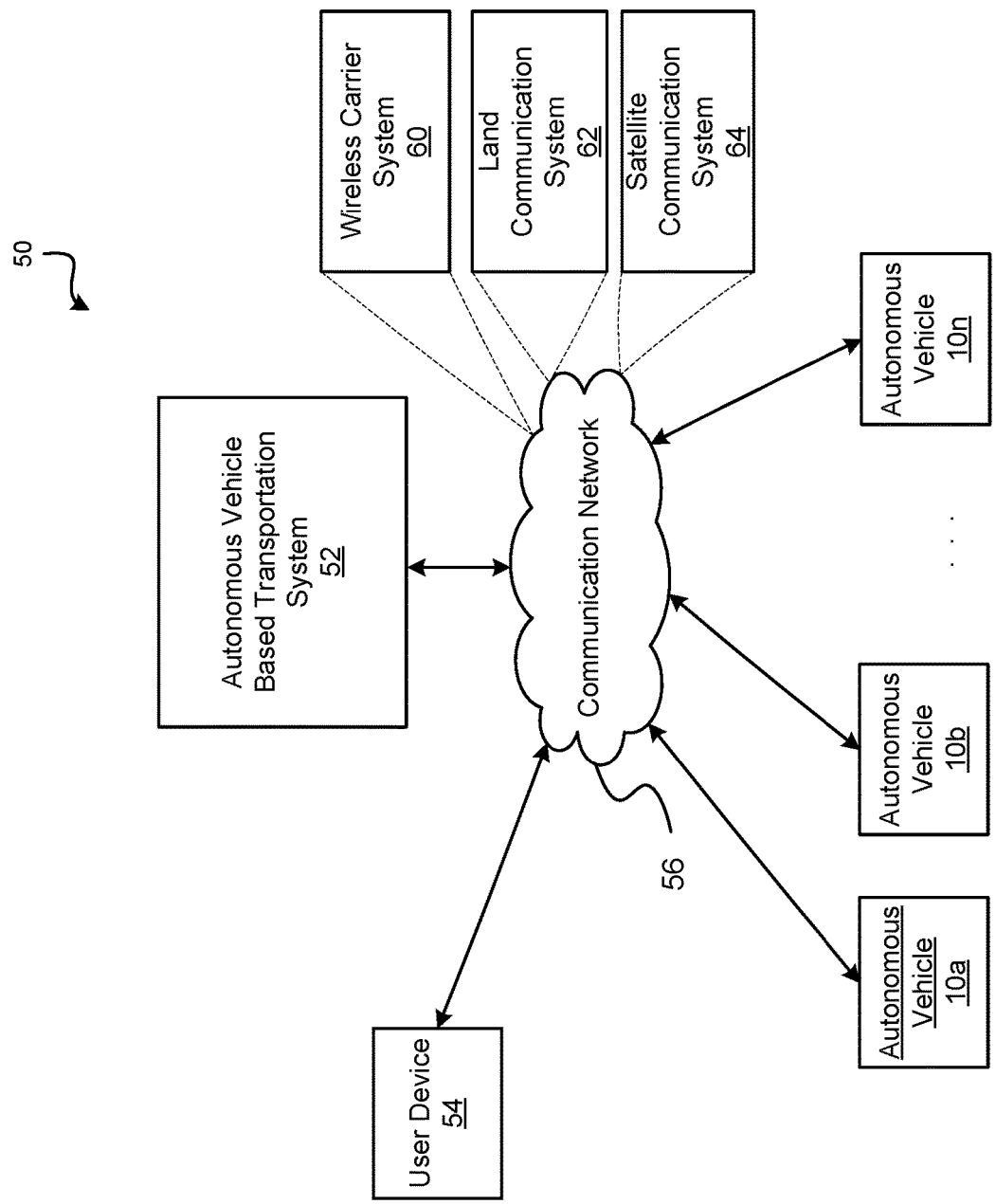
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous-vehicle-based remote transportation system. FIG. 2 illustrates an exemplary embodiment of an operating environment shown generally at 50 that includes an autonomous-vehicle-based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
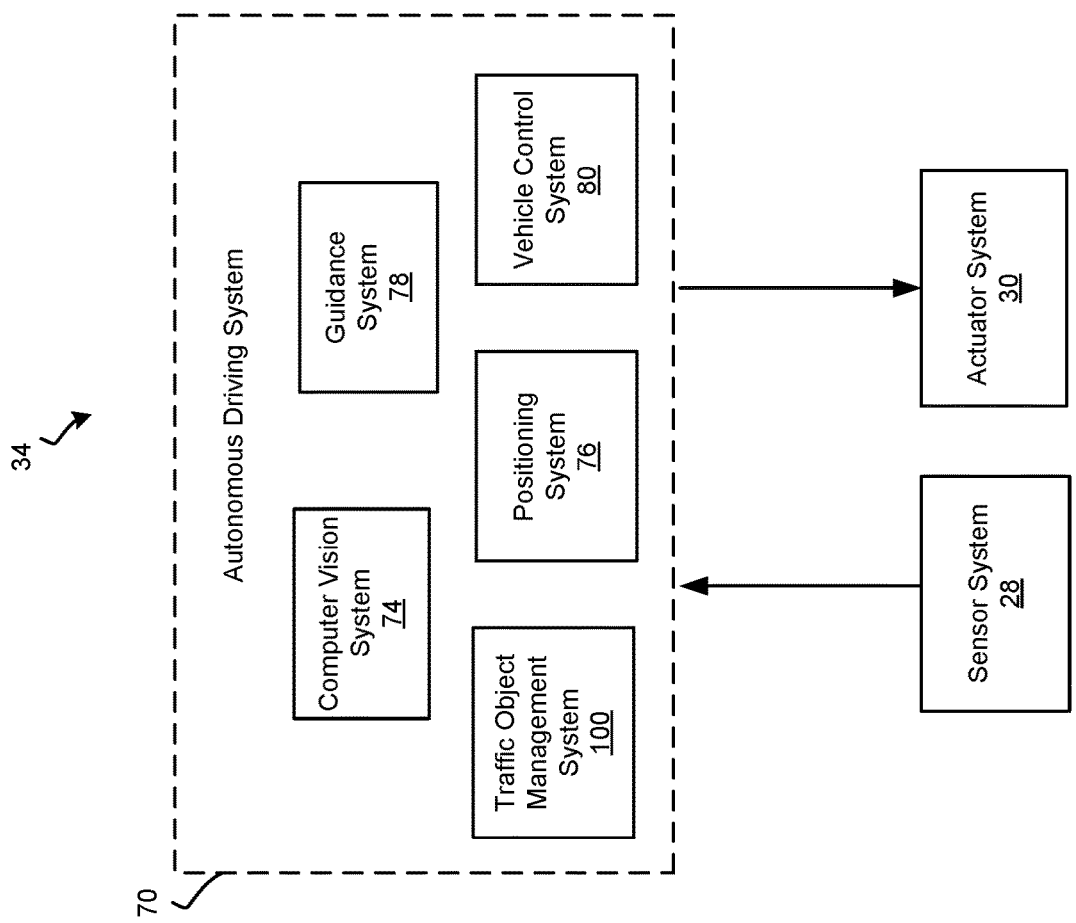
FIG. 3 is functional block diagram illustrating an autonomous driving system (ADS) associated with an autonomous vehicle, in accordance with various embodiments.

In accordance with various embodiments, the controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 10 relative to the environment. As can be appreciated, a variety of techniques may be employed to accomplish this localization, including, for example, simultaneous localization and mapping (SLAM), particle filters, Kalman filters, Bayesian filters, and the like.

The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, all or parts of the traffic object management system 100 may be included within the computer vision system 74, the positioning system 76, the guidance system 78, and/or the vehicle control system 80. As mentioned briefly above, the traffic object management system 100 of FIG. 1 is configured to determine the presence of one or more traffic related objects in the vicinity of the autonomous vehicle 10 (e.g., traffic cones, signs, barricades, or the like), and generate a composite map including a representation of the traffic related object superimposed upon a defined map of the environment—e.g., a map stored within data storage device 32 of FIG. 1.

Figure 4:
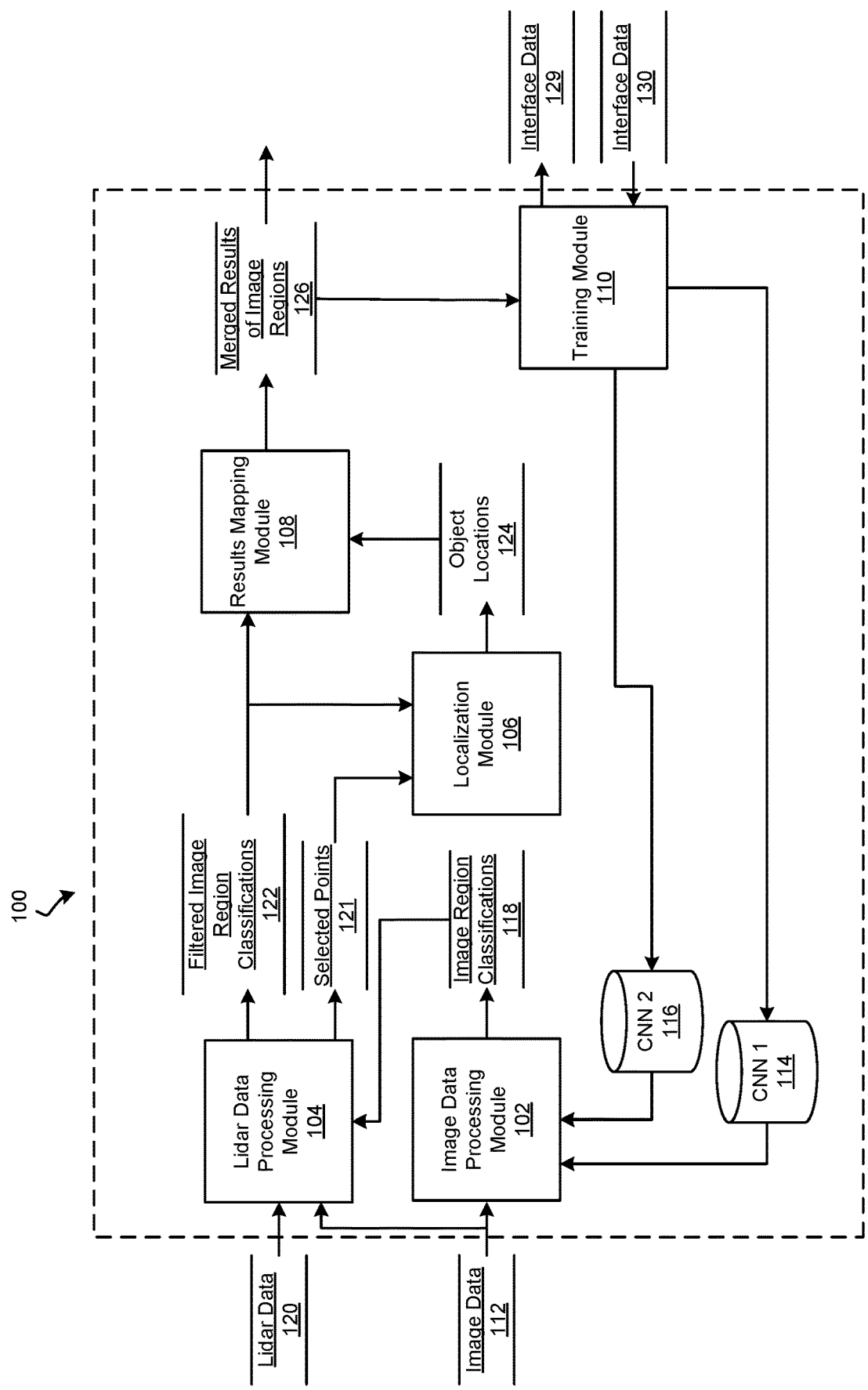
FIG. 4 is a dataflow diagram illustrating a traffic object management system, in accordance with various embodiments.

In that regard, FIG. 4 provides a dataflow diagram that illustrates functions of the traffic object management system 100 in more detail in accordance with various embodiments. Various embodiments of the traffic object management system 100 according to the present disclosure may include any number of modules. As can be appreciated, the modules shown in FIG. 4 may be combined and/or further partitioned to similarly detect, classify, and map traffic related objects. As can further be appreciated, the modules shown in FIG. 4 may be provided in addition to the modules or systems shown in FIG. 3 or as separate modules of a standalone system. Inputs to the traffic object management system 100 may be received from the sensor system 128, received from other controllers of the vehicle 10, and/or determined by other modules (not shown) of the traffic object management system 100. In various embodiments, the traffic object management system 100 includes an image data processing module 102, a lidar data processing module 104, a localization module 106, a results mapping module 108, and a training module 110.

In various embodiments, one or more of the modules 102-110 may be implemented as one or more machine learning models that undergo supervised, unsupervised, semi-supervised, or reinforcement learning and perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models. In some embodiments, training occurs within a system remote from vehicle 10 (e.g., system 52 in FIG. 2) and is subsequently downloaded to vehicle 10 for use during normal operation of vehicle 10. In other embodiments, training occurs at least in part within controller 34 of vehicle 10, itself, and the model is subsequently shared with external systems and/or other vehicles in a fleet (such as depicted in FIG. 2). Training data may similarly be generated by vehicle 10 or acquired externally, and may be partitioned into training sets, validation sets, and test sets prior to training. For exemplary purposes, training will be discussed as being performed partly on the vehicle 10 and partly remote from the vehicle 10.

In various embodiments, the image data processing module 102 receives as input image data 112 from the sensor system 28 (FIG. 1). In various embodiments, the image data 112 includes ROS bag files or other form of data. The image data processing module 102 processes the image data 112 to extract images from the ROS bag files using, for example, a rospkg python module or other extraction module and based on, for example, a time stamp associated with the ROS bag files. As can be appreciated, other forms of image data 112 and/or other methods of processing the image data 112 may be implemented in various embodiments.

The image data processing module 102 then selects candidate image regions from the extracted images using a selective search algorithm. The image data processing module 102 then filters the resulting regions by region size and/or aspect ratio to remove image regions that do not fit expectations of objects of interest. In various embodiments, the expectations of objects of interest include a total region size between 500 and 18000 pixels, with an aspect ratio (height divide width) between, for example 0.24 and 2.3.

The image data processing module 102 then processes the filtered image regions with two or more trained convolutional neural networks 114, 116 to perform image classification. For example, a first network 114 may be trained to separate proposed regions containing traffic signs or other objects from proposed regions not containing traffic signs or other objects. In another example, the second network 116 may be trained to separate proposed regions containing traffic signs or other objects from proposed regions that did not contain traffic signs or other objects but were incorrectly classified by the first network. The classifications can be performed based on colors, identified letters, identified words, shapes, etc. that may identify a road sign. The result of the CNNs 114, 116 includes the image regions and their corresponding classifications 118. As can be appreciated, other methods of extracting image regions and classifying the extracted regions can be implemented in various embodiments. For example, a region proposal network (RPN), which simultaneously detects regions and classifies them, can be implemented in place of the selective search and CNNs.

The lidar data processing module 104 receives as input lidar data 120, the image data 112, and the image regions and their corresponding classifications 118. In various embodiments, the lidar data 120 includes points from a swath five meters wide along a vector pointing from the lidar of the vehicle in the approximate direction of the traffic related object, to a range of about forty meters. As can be appreciated the swath size can be varied in various embodiments. For example, a narrower swath of points can be implemented based on a measured transformation matrix between the camera and the lidar. The lidar data processing module 104 selects a subset of points of the lidar data 120 by accurately projecting all of the points onto the image and keeping points that fall within the image regions.

The lidar data processing module 104 then evaluates the kept points for other attributes that may be indicative of a traffic related object. For example, the lidar data processing module 104 determines if any of the kept points fall within a certain height range and if any of the kept points are highly reflective. If it is determined that some of the kept points fall within a certain height range and some of the kept points are highly reflective, the image region associated with the kept points is selected. If it is determined that none of the kept points fall within a certain height range or none of the kept points are highly reflective, the image region associated with the kept points is discarded. The lidar data processing module 104 then makes available the remaining kept image region classifications as filtered region classifications 122.

The localization module 106 receives as input the filtered image region classifications 122 and the corresponding selected points 121. The localization module 108 then uses the points that fit the expected placement to localize the traffic related object within the classified image region. For example, traffic signs are expected to be highly reflective in infrared LIDAR. The centroid of the highly reflective selected points is set to be the location of the sign relative to the vehicle 10. The localization module 106 then uses location of the vehicle 10 and heading to transform the localization results to object locations world coordinates 124. For example, the relative heading from the vehicle 10 to the object is summed with the absolute heading of the vehicle 10. The world location of the object is found by summing the world location of the vehicle 10 with the relative range to the object projected along the summed heading.

The results mapping module 108 receives as input the object locations in real world coordinates 124 and the associated image region from the filtered image region classifications 122. The results mapping module 108 evaluates the received results over time to confirm the results. For example, results localized within 0.5 meters or other distance of each other are merged to produce merged results 126. The results mapping module 108 stores the merged results 126 as a composite map including a representation of the traffic related object superimposed upon a defined map of the environment—e.g., a map stored within data storage device 32 of FIG. 1.

The training module 110 receives the merged results 126. The training module 110 loads the regions of the images from the merged results 126 and presents them to a human labeler via an interactive web based interface 129. Human labelers are then able to review each region of the image and confirm, by interacting with the interface and generating user input data 130, the class to which it belongs.

Due to localization inaccuracy, multiple results of a same road based sign or object may still exist. In such case, the training module 110 uses other clustering algorithms and knowledge of likely placement of road based signs or objects by type obtained, for example, from map data, to remove any additional duplicates. The training module 110 then uses the final results to refine the classifiers of the neural networks 114, 116.

Figure 5:
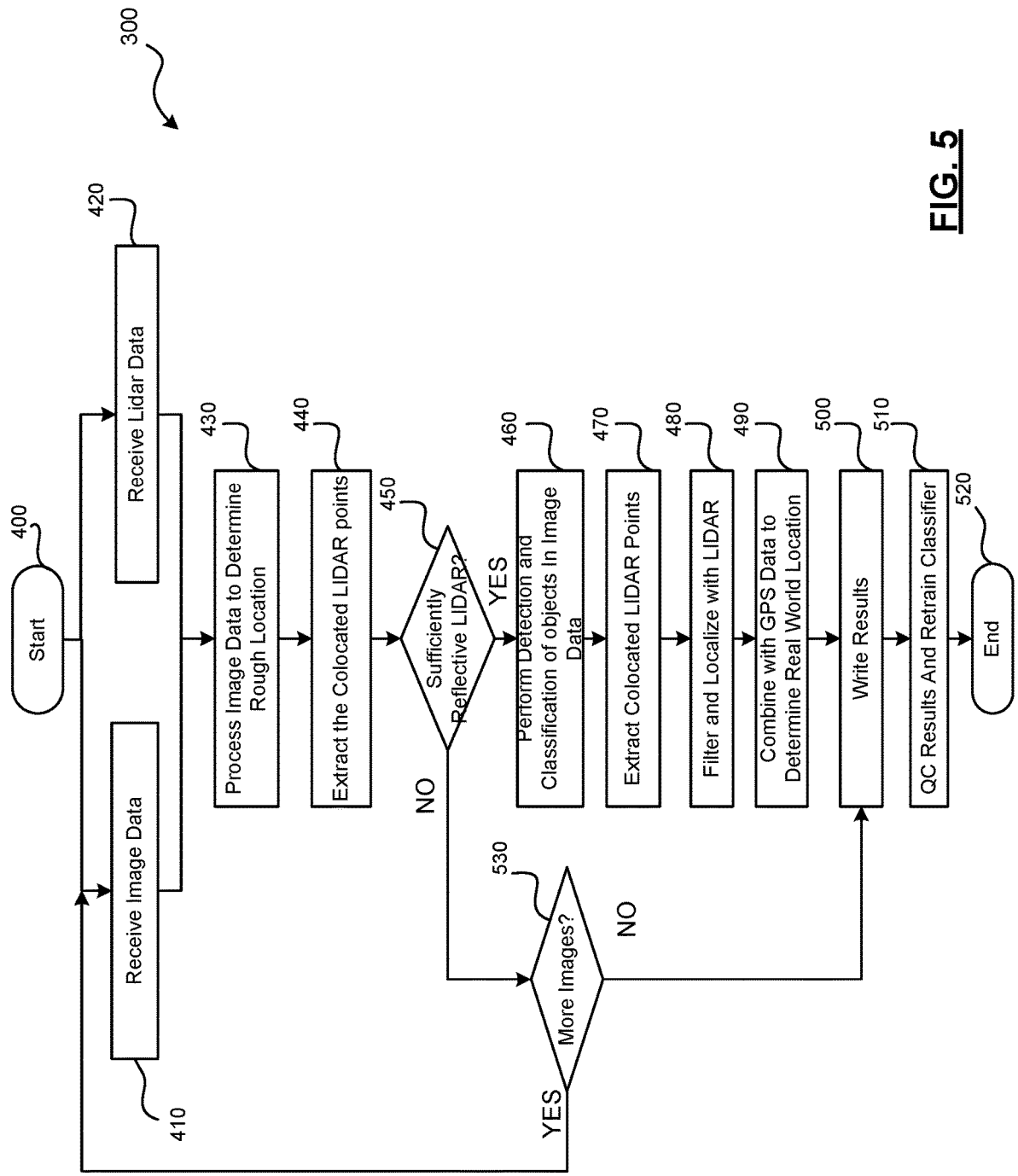
FIG. 5 is a flowchart illustrating a control method for controlling an autonomous vehicle based on the traffic related objects, in accordance with various embodiments.

Referring now to FIG. 5, and with continued reference to FIGS. 1 through 4, a flowchart illustrates a method 300 that may be performed by the system 100 in accordance with various embodiments. As can be appreciated in light of the disclosure, the order of operation within the method is not limited to the sequential execution as illustrated in FIG. 5, but may be performed in one or more varying orders as applicable and in accordance with the present disclosure.

As can further be appreciated, the method of FIG. 5 may be scheduled to run at predetermined time intervals during operation of the vehicle 10, may be performed offline from operation of the vehicle 10, and/or a combination thereof.

In one example, the method may begin at 400. The image data 112 is received at 410. The lidar data 120 is received at 420. The image data 112 is processed at 430 to determine and classify image regions of the image that are of interest, for example, as discussed above with regard to the image processing module 102. The lidar data 120 is processed at 440 to extract the points associated with the regions of the image (e.g., the selected points 121). The points associated with the regions of the image are then evaluated for height and/or reflectivity values at 450. For example, if it is determined that some of the points fall within a certain height range and some of the points are highly reflective, the region associated with the kept points is selected for further processing at 460-490.

For example, at 460, the image processed to detect and classify objects at 460 for example by way of the CNNs 114, 116 discussed above. Collocated LIDAR points are then extracted from the lidar data 112 at 470. The classified objects are then localized and filtered by their location at 480, for example as discussed above with regard to the results mapping module 108. The real world locations of the localized objects are then determined at 490. Thereafter, the results are stored at 500. The results are evaluated via a human labeler and used to retrain the neural networks 114, 116 at 510. Thereafter, the method may end at 520.

If, at 450, it is determined that none of the points fall within a certain height range or none of the kept points are highly reflective, the image region associated with the points is discarded and it is determined whether there are more images to process at 530. If there are more images to process at 530, the method proceeds back to receiving image data 112 and lidar data 120 at 410 and 420 respectively. If, however, there are no more images at 530, the method continues with storing the results at 500, the results are evaluated (if available) via a human labeler at and used to retrain the neural networks 114, 116 at 510. Thereafter, the method may end at 520.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of mapping traffic related objects, comprising:
    receiving image sensor data relating to an environment associated with a vehicle;
    receiving lidar sensor data relating to the environment associated with the vehicle;
    identifying, by a processor, a traffic control object from the image sensor data based on an identified letter, an identified word, and a shape, wherein the traffic control object includes a traffic cone, a sign, and a barricade;
    selecting, by a processor, at least one image region including the traffic control object from the image sensor data;
    selecting, by a processor, a first subset of points of the lidar sensor data by projecting lidar points of the lidar sensor data onto the image sensor data and keeping a second subset of points from the first subset of points that fall within the image region;
    selectively filtering, by a processor, the at least one image region based on the second subset of points of the lidar sensor data, wherein when a first number of the second subset of points fall within a height range and a second number of the second subset of points indicate a reflective value, the at least one image region is selected, wherein when none of the second subset of points fall within a height range or none of the second subset of points indicate a reflective value, the at least one image region is discarded; and
    generating, by a processor, a composite map including a representation of the traffic control object superimposed upon a defined map of the environment based on the selectively filtering.

2. The method of claim 1, further including localizing the traffic control object based on the lidar data.

3. The method of claim 2, further comprising determining a centroid position of the subset of points and wherein the localizing is based on the centroid position.

4. The method of claim 1, wherein selecting the at least one image region is based on at least one machine learning method.

5. The method of claim 4, wherein the at least one machine learning method includes a convolutional neural network.

6. The method of claim 5, further comprising training the convolutional neural network based on results of the selectively filtering.

7. The method of claim 1, wherein the identifying the traffic control object and the selecting the image region is based on a region proposal network.

8. A system for controlling a vehicle, comprising:
    an image sensor that generates image sensor data relating to an environment associated with a vehicle;
    a lidar sensor data that generates lidar sensor data relating to the environment associated with the vehicle; and
    a control module having a processor configured to identify a traffic control object from the image sensor data based on an identified letter, an identified word, and a shape within the image sensor data, wherein the traffic control object includes a traffic cone, a sign, and a barricade, select at least one image region including the traffic control object from the image sensor data, select a first subset of points of the lidar sensor data by projecting lidar points of the lidar sensor data onto the image sensor data and keeping a second subset of points from the first subset of points that fall within the image region, selectively filter the at least one image region based on the second subset of points of the lidar sensor data, wherein when a first number of the second subset of points fall within a height range and a second number of the second subset of points indicate a reflective value, the at least one image region is selected, wherein when none of the second subset of points fall within a height range or none of the second subset of points indicate a reflective value, the at least one image region is discarded, generate a composite map including a representation of the traffic control object superimposed upon a defined map of the environment based on the selectively filtering, and control the vehicle based on the composite map.

9. The system of claim 8, wherein the control module is further configured to localize the traffic control object based on the lidar data.

10. The system of claim 8, wherein the control module selects the at least one image region based on at least one machine learning method.

11. The system of claim 10, wherein the control module determines a centroid position of the subset of points and wherein the localizing is based on the centroid position.

12. The system of claim 8, wherein the at least one machine learning method includes a convolutional neural network.

13. The system of claim 12, wherein the control module is further configured to train the convolutional neural network based on results of the selectively filtering.

14. The system of claim 8, further comprising an interactive interface that receives, by a processor, user input for classifying the image region.

15. The system of claim 8, wherein the control module is further configured to localize the traffic control object to real world coordinates based on a location and a heading of the vehicle.

16. The system of claim 8, wherein the control module identifies the traffic control object and the selecting the image region is based on a region proposal network.

* * * * *